United States Patent
Bose et al.

(10) Patent No.: US 9,423,859 B2
(45) Date of Patent: Aug. 23, 2016

(54) DELAYING EXECUTION IN A PROCESSOR TO INCREASE POWER SAVINGS

(71) Applicant: International Business Machines Corporation, Armonk, NY (US)

(72) Inventors: Pradip Bose, Yorktown Heights, NY (US); Alper Buyuktosunoglu, White Plains, NY (US); Hans M. Jacobson, White Plains, NY (US); Augusto J. Vega, Astoria, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 264 days.

(21) Appl. No.: 14/245,301

(22) Filed: Apr. 4, 2014

(65) Prior Publication Data
US 2015/0286261 A1    Oct. 8, 2015

(51) Int. Cl.
G06F 1/26  (2006.01)
G06F 1/32  (2006.01)

(52) U.S. Cl.
CPC .............. G06F 1/324 (2013.01); G06F 1/329 (2013.01); G06F 1/3296 (2013.01)

(58) Field of Classification Search
CPC ...................................................... G06F 1/324
See application file for complete search history.

(56) References Cited

U.S. PATENT DOCUMENTS

| | | | | |
|---|---|---|---|---|
| 6,247,134 B1* | 6/2001 | Sproch | .................. | G06F 9/3867 703/18 |
| 6,687,838 B2* | 2/2004 | Orenstien | .............. | G06F 1/3228 712/E9.032 |
| 7,276,932 B2 | 10/2007 | Kuang et al. | | |
| 7,752,471 B1* | 7/2010 | Kolokowsky | ......... | G06F 3/0625 710/315 |
| 8,020,025 B2* | 9/2011 | Hyatt | .................... | G06F 1/3203 713/320 |
| 8,112,648 B2* | 2/2012 | Branover | .............. | G06F 1/3203 713/320 |
| 8,219,833 B2 | 7/2012 | Basak et al. | | |
| 8,892,916 B2* | 11/2014 | Bieswanger | .......... | G06F 1/3203 713/300 |
| 2007/0157044 A1* | 7/2007 | You | ....................... | G06F 1/3203 713/320 |
| 2013/0086400 A1 | 4/2013 | Teoh | | |
| 2014/0215236 A1* | 7/2014 | Heinrich | ................. | G06F 1/329 713/320 |

OTHER PUBLICATIONS

List of IBM Patents or Patent Applictions Treated as Related; (Appendix P), Filed Apr. 25, 2016, 2 pages.
Pradip Bose, et al., Pending U.S. Appl. No. 15/137,184 entitled "Delaying Execution in a Processor to Increase Power Savings," filed with the U.S. Patent and Trademark Office on Apr. 25, 2016.
Pradip Bose, et al., Pending U.S. Appl. No. 15/137,197 entitled "Delaying Execution in a Processor to Increase Power Savings," filed with the U.S. Patent and Trademark Office on Apr. 25, 2016.

* cited by examiner

Primary Examiner — Mark Connolly
(74) Attorney, Agent, or Firm — Cantor Colburn LLP

(57) ABSTRACT

Embodiments relate to storing data in memory. An aspect includes applying a power savings technique to at least a subset of a processor. Pending work items scheduled to be executed by the processor are monitored. The pending work items are grouped based on the power savings technique. The grouping includes delaying a scheduled execution time of at least one of the pending work items to increase an overall number of clock cycles that the power savings technique is applied to the processor. It is determined that an execution criteria has been met. The pending work items are executed based on the execution criteria being met and the grouping.

8 Claims, 6 Drawing Sheets

DELAYING EXECUTION IN A PROCESSOR TO INCREASE POWER SAVINGS

BACKGROUND

The present invention relates generally to computer systems, and more specifically, to delaying execution in a processor in order to increase power savings potential.

In computer systems with multiple interconnected components (e.g., processors, accelerators, memory) it is often the case that some components are busy while others are idle. A standard method of reducing power usage by components during inactive intervals is to use power gating to activate sleep or power down modes. According to this method, the logic is built of low-threshold transistors, with high-threshold transistors serving as a footer or header to cut leakage during the quiescence intervals. During normal operation mode, the circuits achieve high performance, resulting from the use of low-threshold transistors. During sleep mode, high threshold footer or header transistors are used to cut off leakage paths, reducing the leakage currents by orders of magnitude. Another method of reducing the active power is transparent clock gating (TCG). TCG takes advantage of bubbles in a pipeline to avoid clocking latches when a pair of data items are separated by more than one clock cycle (i.e. not back-to-back), potentially reducing clock power by fifty percent in some units for normal workloads.

A general drawback associated with such techniques of power savings is that periods of idleness (or pipeline bubbles) for a given resource are often not long enough to support the overhead associated with activating and deactivating the power savings technique, even when the fraction of idle cycles relative to the total number of execution cycles is rather large.

SUMMARY

Embodiments include computer implemented methods, systems and computer program products for storing data in memory. A method includes applying a power savings technique to at least a subset of a processor. Pending work items scheduled to be executed by the processor are monitored. The pending work items are grouped based on the power savings technique. The grouping includes delaying a scheduled execution time of at least one of the pending work items to increase an overall number of clock cycles that the power savings technique is applied to the processor. It is determined that an execution criteria has been met. The pending work items are executed based on the execution criteria being met and the grouping.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the present invention relate to delaying non-critical instructions in order to increase power gating efficiency. In an embodiment, the issuance of ready instructions in an issue queue can be delayed when there are less than a specified number of ready instructions in the issue queue and when the ready instructions have been waiting for less than a specified maximum number of clock cycles. This can allow the idle period for the resource that executes the ready instructions to be elongated. In addition, pending requests to off-chip memory can be delayed and sent in bursts. In addition, data being sent through a pipeline can be grouped and non-critical data items delayed to take advantage of transparent clock gating (TCG).

Figure 1:
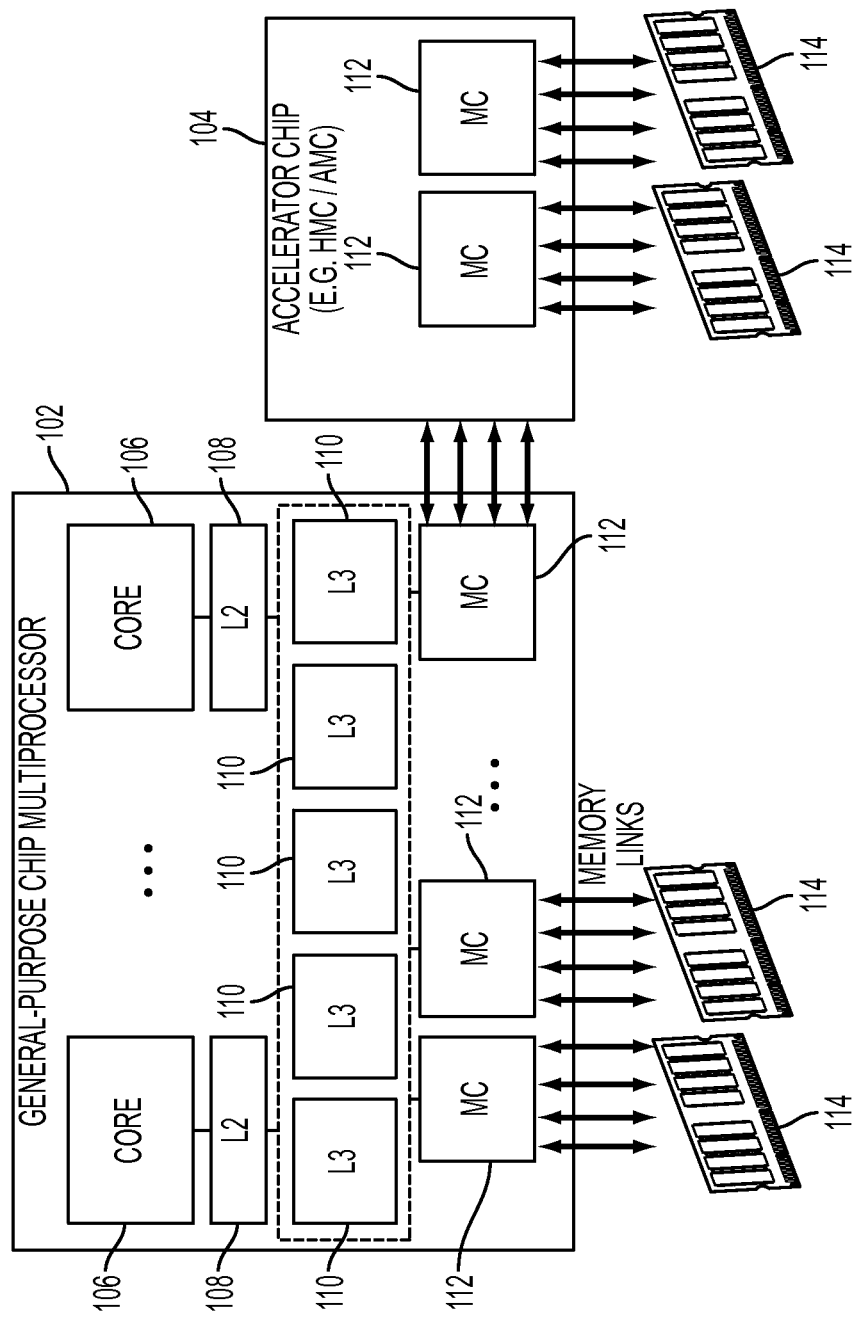
FIG. 1 illustrates a block diagram of a system in accordance with an embodiment.

Referring now to FIG. 1, a block diagram of a computer system in accordance with embodiments is generally shown. The computer system includes a multiprocessor chip 102, an accelerator chip 104, and memory devices 114. As used herein, the term "chip" refers to an integrated circuit, i.e., a set of electronic circuits on one small plate (chip) of semiconductor material (e.g., silicon). As shown in FIG. 1, the multiprocessor chip 102 can include one or more cores 106 (also referred to as "core processors") and corresponding level two (L2) caches 108, one or more level three (L3) caches 110, and one or more memory controllers 112. The memory controller 112 can connect to the memory devices 114 and the accelerator chip 104 via one or more memory links. The multiprocessor chip 102 shown in FIG. 1 is a multi-core processor that is implemented by a single computing component with two or more independent actual central processing units (CPUs) (referred to as "cores 106" in FIG. 1). The cores 106 can include level one (L1) cache, and they can read and execute program instructions (e.g. via execution units). The instructions can include ordinary CPU instructions such as add, move data, and branch, but the multiple cores 106 can run multiple instructions at the same time, increasing overall speed for programs amenable to parallel processing. Embodiments described herein can be implemented by program instructions executing on the multiprocessor chip 102.

As shown in FIG. 1, the accelerator chip 104 can be implemented, for example, by a hybrid memory cube (HMC). The accelerator chip 104 can include memory controllers 112 that are connected, via memory links to memory devices 114.

The memory devices 114 can be implemented by, but are not limited to: a combination of various types of computer readable storage media, such as a hard disk, a random access memory (RAM), a read-only memory (ROM), an erasable programmable read-only memory (EPROM or Flash memory), an optical fiber, and the like, to store executable instructions and associated data.

Figure 2:
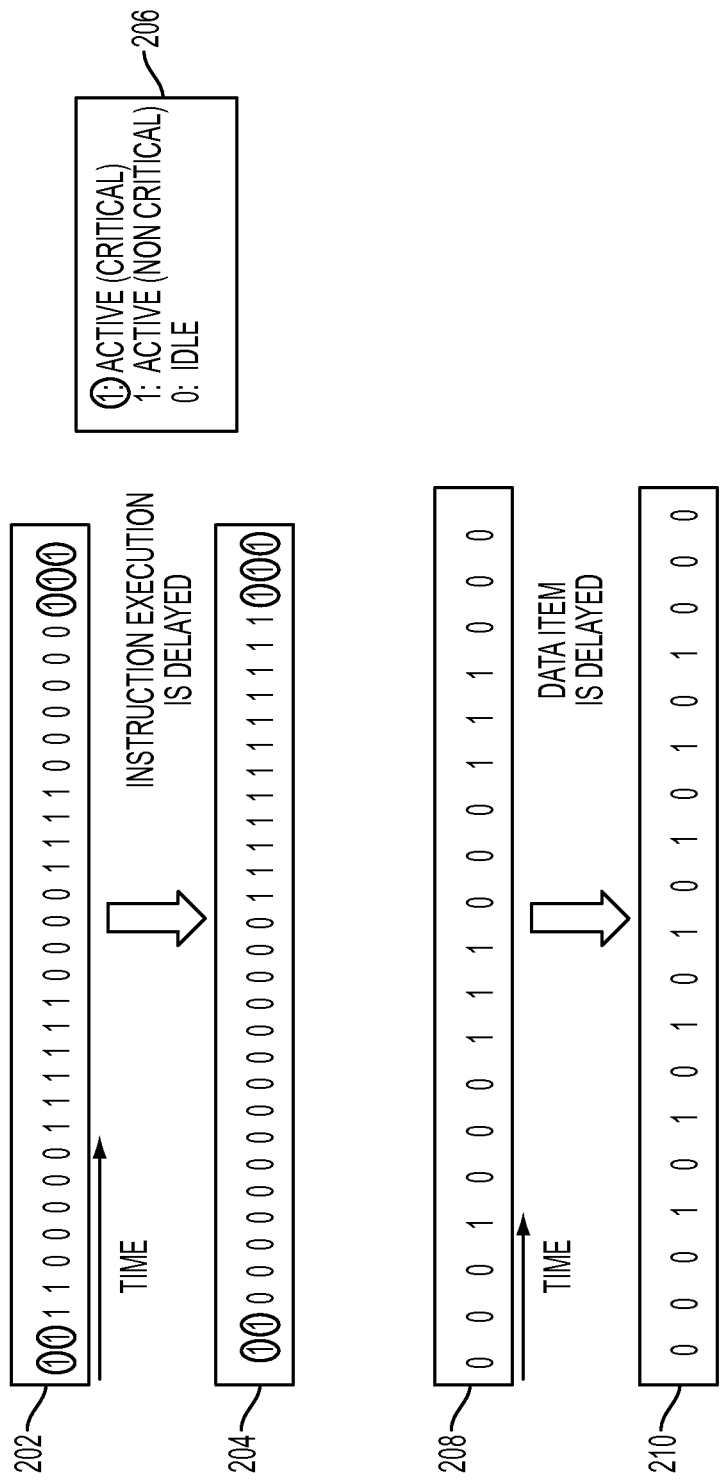
FIG. 2 illustrates block diagrams of various sequences of activity bits in accordance with embodiments.

Referring now to FIG. 2, a sequence of activity bits 202 (each bit representing a clock cycle) of an execution unit, or unit, operating on a core 106 is generally shown. Examples of units include, but are not limited to: an arithmetic logic unit (ALU), a multiply/add-accumulate unit (MAAC), and a control unit (CU). The power gating potential of a unit depends on the idle interval size as well as the number of idle intervals. The sequence of activity bits 202 shown in FIG. 2 has three idle intervals. As shown in legend 206, activity bits labeled "1" indicate active cycles and "0" indicate idle cycles. Assuming an overhead value of three cycles for activating a power gating mode (includes several overhead values, like for example, the activation of the header or footer transistor, among others), the unit can be power gated for up to six (calculated as (5−3)+(4−3)+(6−3)) cycles out of a total of fifteen idle cycles, thereby achieving a forty percent power gating potential (calculated as 6/15).

Also, in dealing with such small duration idle sequences, the performance overhead could be large. For example, if we assume a latency of one cycle to deactivate a power gating mode (Twakeup penalty), then there would be three additional cycles added to the execution time. This would represent a nine point four percent (calculated as 3/32) performance overhead. More power savings with less performance overhead could be achieved if the idle duration times were made longer.

An embodiment described herein increases the power gating potential of a unit by delaying the execution of non-critical operations. In the example shown in FIG. 2, it is assumed that the "1s" that are contained in a circle are critical and cannot be delayed without impacting performance. It is also assumed that the "1s" that are not contained in a circle are not critical and could be delayed, for a short period, without impacting performance. In an embodiment, the operations can be grouped (e.g., by a compiler, by hardware issue logic) to achieve an execution profile such as that indicated by the modified sequence of activity bits 204 shown in FIG. 2. In the modified sequence of activity bits 204, the power gating interval is twelve cycles (calculated as (15−3)), with a three point one percent performance overhead (calculated as 1/32) assuming a Twakeup penalty of one cycle. This translates into a new PGE of eighty percent (calculated as 12/15) when three cycles are required each time the power gate is activated.

Also shown in FIG. 2 a sequence of activity bits 208 representing data items being sent to a pipeline within a unit (e.g., a MAAC) in a core 106 is generally shown. The TCG potential of a unit can depend on the idle interval size as well as the number of idle intervals. For example, the sequence of activity bits 208 shown in FIG. 2 has alternating idle and active intervals. A data item propagating through a normally clocked pipeline would require "S" clock cycles, where S is the number of pipeline stages. A data item "D1" propagating through a TCG pipeline is clocked only floor (S/c), where "c" is the number of cycles separating data item D1 from the next upstream data item "D2." In sequence of activity bits 208, where S=3, a normally clocked pipeline would require twenty-one clocks (calculated as 7 active bits multiplied by 3 stages) to be generated. In contrast, a TCG pipeline would require only twelve clocks (calculated as 4*floor(3/1)+2*floor(3/4)+1*floor(3/4)=12+0+0=12) to be generated. However, embodiments described herein can further improve the clocking in a TCG pipeline by altering the spacing between adjacent data items. As shown in sequence of activity bits 210, the second, third, fifth, and sixth data items can each be delayed by one clock cycle. In this example, the normally clocked pipeline still requires twenty-one clocks, but the TCG pipeline now only requires six clocks (calculated as 6*floor(3/2)+1*floor(3/4)=6+0=6) to be generated. By grouping and delaying some of the data items (thus rearranging the bubbles in the pipeline), for the sequence of activity bits 208, the TCG pipeline can thus reduce its clocking requirements by fifty percent while still providing the same data throughput (note that the number of clock cycles between the first and last data item is not changed).

Figure 3:
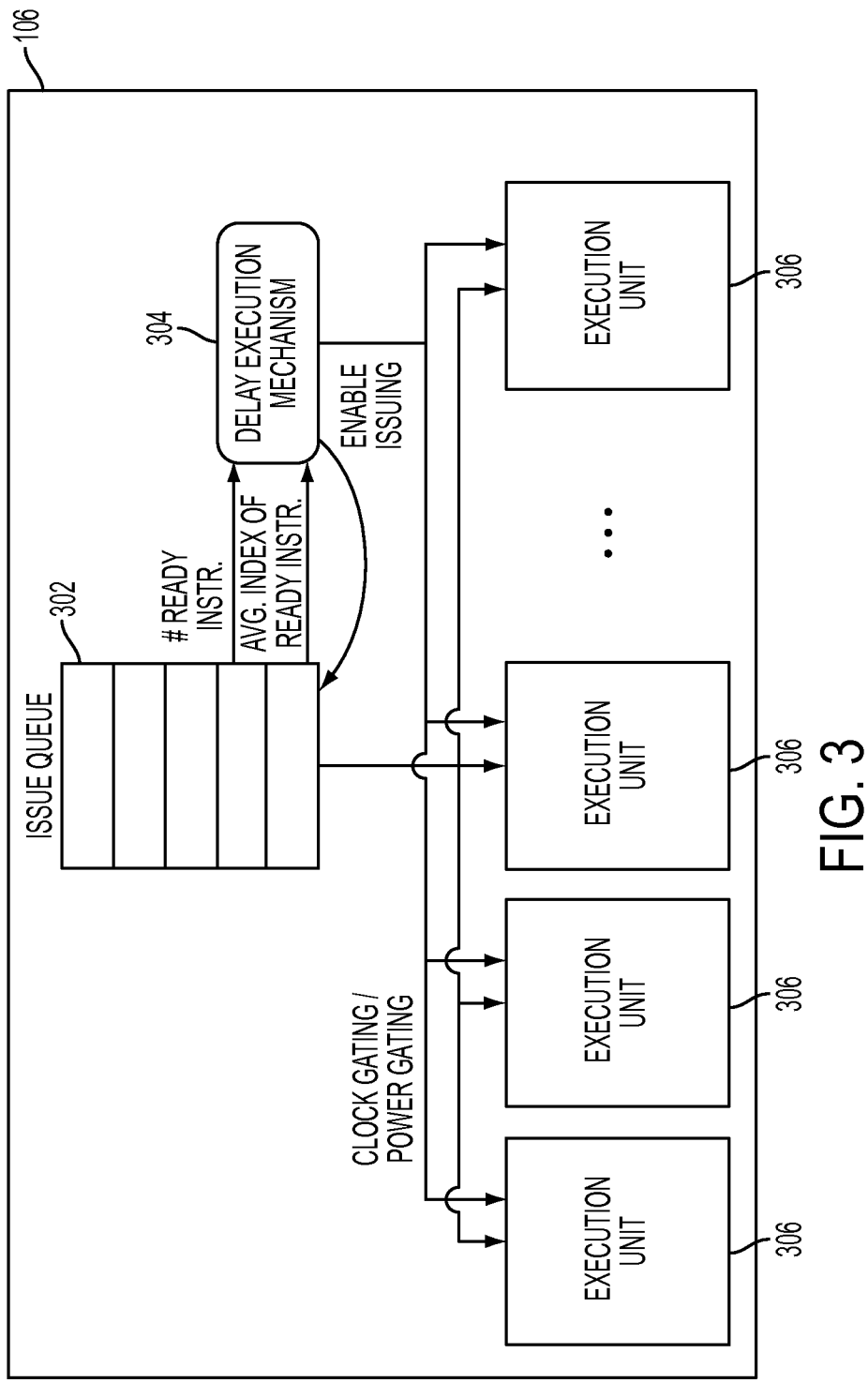
FIG. 3 illustrates a block diagram of a central processing unit that is configured to delay instruction execution in accordance with an embodiment.

Turning now to FIG. 3, a central processing unit that is configured to delay instruction execution is generally shown in accordance with an embodiment. Shown in FIG. 3 is a core 106 that includes a delay execution mechanism 304, an issue queue 302, and execution units 306. In an embodiment, the delay execution mechanism 304 can be implemented at the instruction issue stage to: monitor the issue queue 302 and to enable/disable issuing; and to actuate clock/power gating when issuing is delayed. In addition, the delay execution mechanism 304 can communicate with the issue queue 302 to monitor a number of ready instructions in the issue queue 302 and an average age (e.g., average index of ready instruction) of the ready instructions in the issue queue 302.

Figure 4:
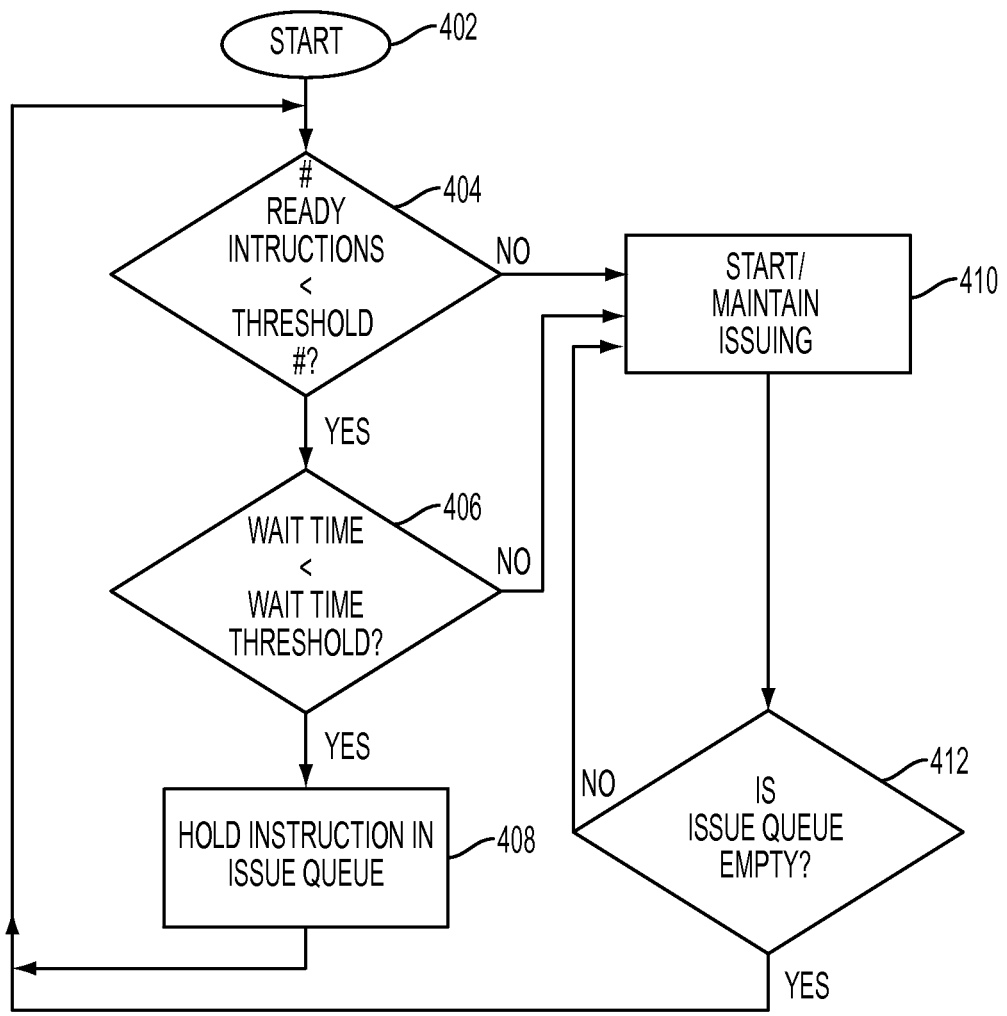
FIG. 4 illustrates a process flow for delaying instruction execution in accordance with an embodiment.

Turning now to FIG. 4, a process flow for delaying instruction execution is generally shown in accordance with an embodiment. The processing shown in FIG. 4 can be implemented by the delay execution mechanism 304 executing on a core 106 such as, but not limited to a super scalar, out-of-order processor. As shown in FIG. 4, an issue queue 302 feeds instructions to an execution unit 306, and the number of ready instructions in the issue queue 302 as well as a wait time the issue queue 302 can be used as proxies to decide when to delay. The process starts at block 402, with a mechanism located in, or accessed by, the issue queue 302 (e.g., the delay execution mechanism 304) keeping track of the number of ready instruction in the issue queue 302. Ready instructions, as known in the art, are those instructions that are ready to be issued (e.g., all dependencies have been resolved). At block 404 it is determined whether the number of ready instructions in the issue queue 302 is less than a threshold number. If the number of ready instructions in the issue queue 302 is not less than the threshold number as determined at block 404, the processing continues at block 410 where the issue queue 302 starts issuing the ready instructions to an execution unit 306. It is determined, at block 412, if the issue queue 302 is empty, if it is not empty, then processing continues at block 410. In an embodiment the loop of blocks 410-412 can be continued until the issue queue 302 is empty. Once the issue queue 302 is empty, as determined at block 412, processing can continue at block 404. Thus, once the issue queue 302 starts to issue instructions it can continue until the issue queue 302 is empty.

In an embodiment, the threshold can be programmable and/or modified during system operation based on factors such as workload, performance, quality of service, and other metrics. When the number of ready instructions in the issue queue 302 reaches the threshold, the instructions can be issued to execution pipes in the execution units 306. With this approach, the ready instructions will be clustered for execution instead of issuing independently in different times, thus possibly creating a long idle interval from execution unit point of view.

Still referring to FIG. 4, if it is determined at block 404, that the number of instructions in the issue queue 302 is less than the threshold number, then processing continues at block 406. Block 406 is performed to mitigate possible performance losses due to critical instructions being in a ready status in the issue queue 302. Critical instructions can be those which have several other instructions dependent on them that may get delayed for execution by waiting for the number of ready instructions in the issue queue 302 to reach the threshold number. These critical instructions can be identified by determining if any of the ready instructions in the issue queue 302 have been waiting longer than a maximum number of cycles reflected in a wait time threshold number. If it is determined, at block 406, that any of the ready instructions have been waiting longer than the specified wait time threshold, then processing continues at block 410, where the issue queue 302 begins to issue the ready instructions. If it is determined, at block 406, that the ready instructions in the issue queue 302 have been waiting less than the maximum number of cycles, then processing continues at block 408 and the instructions continue to be held in the issue queue 302. Processing continues at block 404. Thus, the issue queue 302 does not start issuing the ready instructions until one of two things happen: a number of ready instructions in the issue queue 302 reaches the threshold number or a ready instruction has been in the issue queue 302 for longer than a maximum threshold number of clock cycles.

In an embodiment, the processing at block 410 can also include removing (or requesting removal of) power gating and/or clock gating from the execution unit 306. In an embodiment, if it is determined at block 412, that the issue queue 302 is empty, a power gate and/or clock gate is activated (or requested to be activated) for the execution unit 306. As used herein the term power gating refers to using a header or footer transistor to cut off the power supply for the unit 306 to reduce both its dynamic and leakage power dissipation. As used herein the term clock gating refers to disabling the clock of unit 306 to reduce its dynamic power dissipation.

In an embodiment, block 406 of FIG. 4 can be skipped resulting in issuance decisions being made solely on a number of ready instructions in the issue queue 302.

In an embodiment, the processing shown in FIG. 4 is performed for each execution unit 306 connected to the issue queue 302 and the processing takes into account a target execution unit 306 and keeps track of counts and wait times for different execution units separately 306. Thus, instructions may be issued from the issue queue 302 for one execution unit 306 while being held for another execution unit 306. In addition, different thresholds may be utilized for the different execution units.

Similar to the power gating example shown above, there are several techniques to delay execution for TCG. The concept and techniques are the same both for power gating and TCG, with the only difference being that the algorithms are tuned to separating the instructions in the TCG case, rather than clustering the instructions as in the power gating case. For example, an embodiment of a technique can use information from an issue queue 302 in an out-of-order processor to delay execution of instructions based on a power/performance tradeoff. For example, when a non-critical instruction is ready to issue the cycle after another instruction has been issued, the non-critical instruction can be delayed by one or more cycles.

Another technique utilized by embodiments is to distribute instructions to different units in a round-robin fashion when there are not enough instructions ready to issue to fill up all units so that additional bubbles are created.

In another embodiment, for cache pre-fetch engines, delays can be inserted between sequential pre-fetches to create bubbles in the pre-fetch and cache/memory pipelines without much impact to performance. In in-order or very long instruction word (VLIW) machines, the compiler can group instructions based on criticality information such that units will see more bubbles. Compilers may be able to achieve this to some degree even in out of order execution machines. In low power modes of operation or power emergencies, bubbles can also be inserted more judiciously even between critical instructions.

Figure 5:
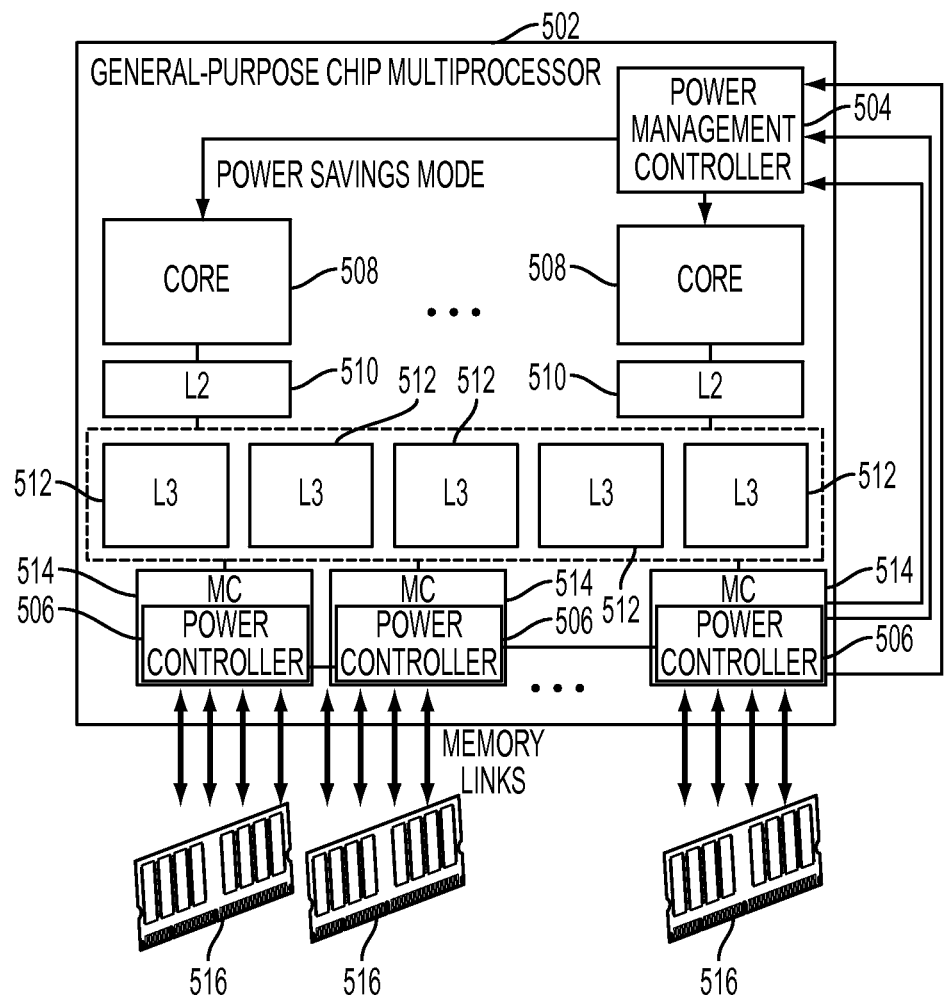
FIG. 5 illustrates a block diagram of a system that includes power management in accordance with an embodiment.

Referring now to FIG. 5, a block diagram of a computer system that includes power management in accordance with an embodiment is generally shown. The computer system includes a multiprocessor chip 502 and memory devices 516. As shown in FIG. 5, the multiprocessor chip 502 can include a power management controller (PMC) 504, one or more cores 508 (also referred to as "core processors") and corresponding L2 caches 510, one or more L3 caches 512, and one or more memory controllers 514. The memory controller 414 can connect to the memory devices 516 via one or more memory links. Embodiments described herein can be implemented by program instructions executing on the multiprocessor chip 102. The PMC 504 shown in FIG. 5 is connected to the cores and can send power savings mode instructions to the cores 508. In addition, the PMC 504 shown in FIG. 5 is connected to the power controllers 506 located in the memory controller 514 for receiving power management data.

In an embodiment, the power controllers 506 in the memory controllers 514 can include computer instructions to delay off-chip requests to memory devices 516. The power controllers 506 can send pending requests in bursts, and when a power controller 506 initiates a burst it can notify the PMC 504. The PMC 504 can then decide to activate a core-level power savings mode such as, but not limited to dynamic voltage and frequency scaling (DVFS) and per-core power gating (PCPG). In addition, the power controllers 506 can notify the PMC 504 when memory responses begin to arrive to allow the PMC 504 to begin a wake-up process for the cores 508 in advance.

Figure 6:
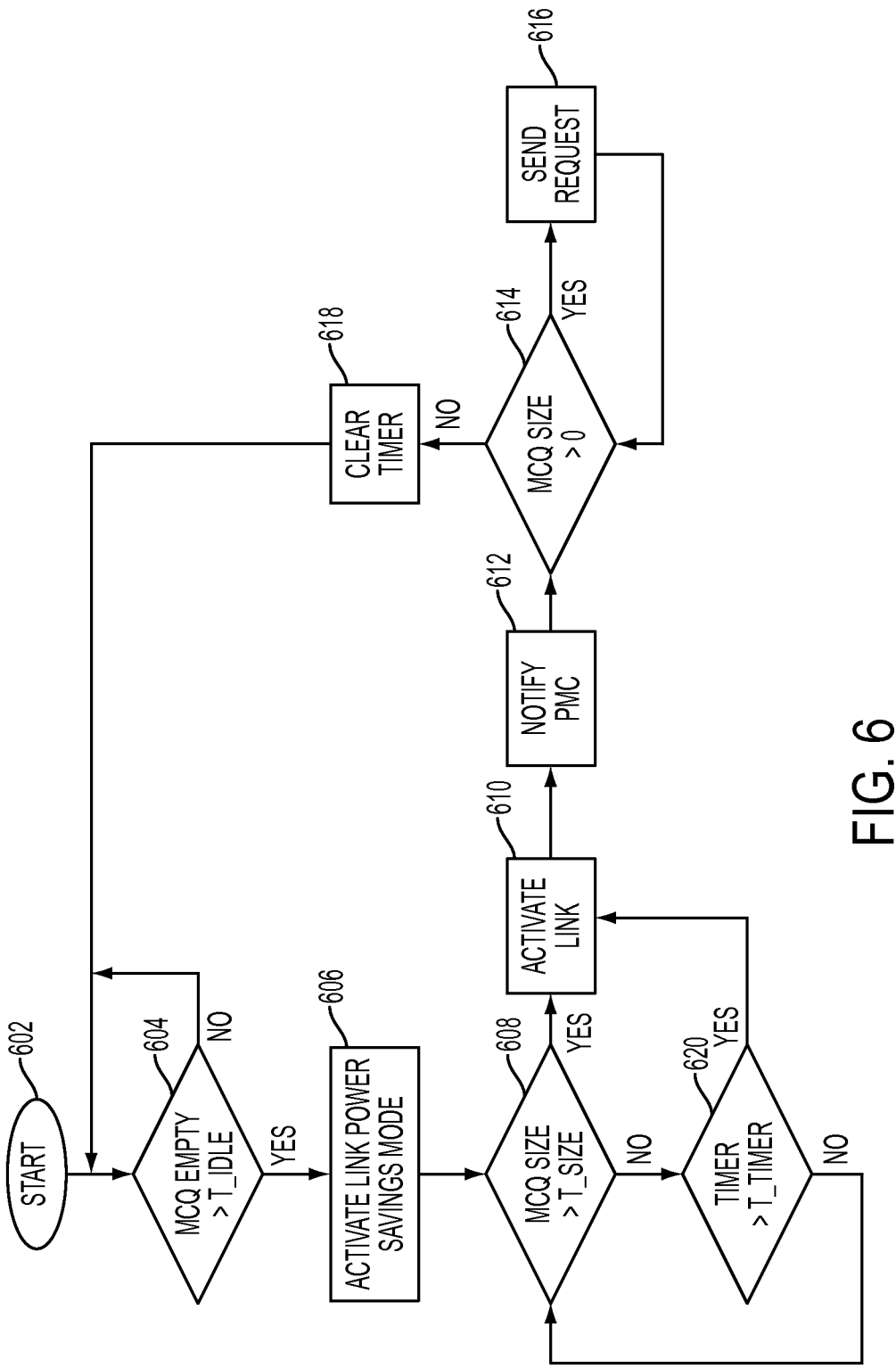
FIG. 6 illustrates a process for rescheduling off-chip memory accesses in accordance with an embodiment.

Referring now to FIG. 6, a process for rescheduling off-chip memory accesses to increase low-activity periods at the core level is generally shown in accordance with an embodiment. Processing starts at block 602 and then moves to block 604 where it is determined whether a queue associated with a memory controller 514 has been empty for more than a threshold number of cycles, "T_IDLE". Block 604 continues to be performed until it is determined that the memory controller queue (MCQ) has been empty for more than the threshold number of cycles. Once this is determined, processing continues at block 606 where a link power savings mode is initiated for memory links associated with the memory controller 514. In addition, the associated memory devices 516 can also be notified that nothing will be sent so that the memory devices 516 can enter a power savings mode. At block 608, it is determined whether the size (number of entries) of the MCQ is greater than a threshold size, "T_SIZE." If a number of entries in the MCQ are not greater than the threshold, then block 620 is performed to determine whether a time since the last burst to the memory devices 516 is more than a threshold, "T_TIMER." If the number of entries in MCQ is not greater than the threshold T_SIZE and the time since the last burst is not greater than the threshold T_TIMER, then processing continues at block 608 to continue to test these two values. If either the number of entries in MCQ is greater than the threshold T_SIZE as determined at block 608 or the time since the last burst is greater than the threshold T_TIMER as determined at block 620, the processing continues at block 610. At block 610, the links between the memory controller 514 and the memory devices 516 are activated. Next, block 612 is performed and the PMC 504 is notified that the links are being activated. In an alternate embodiment, block 612 is skipped and the PMC 504 is not notified of the links being activated.

Processing continues at blocks 614-616 where all of the contents (requests) of the MCQ are sent to the off-chip memory devices 516 for processing. Once MCQ is empty, processing continues at block 618 where the time is cleared and processing continues at block 604.

Technical effects and benefits include delaying non-critical instruction execution at the pipeline level which can lead to reduced power at the execution units. In addition, rescheduling off-chip accesses to increase low-activity periods at the core level can lead to reduced power at the cores, caches and interconnections.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
    applying a power savings technique to at least a subset of a processor;
    monitoring pending work items scheduled to be executed by the processor;
    grouping the pending work items based on the power savings technique, the grouping including delaying a scheduled execution time of at least one of the pending work items to increase an overall number of clock cycles that the power savings technique is applied to the processor;
    determining that an execution criteria has been met; and
    executing the pending work items based on the execution criteria being met and the grouping, wherein:
        the power savings technique is power gating,
        the pending work items are ready instructions located in an issue queue,
        the executing is by an execution unit on the processor,
        the power savings technique is applied to the execution unit, and
        the execution criteria includes at least one of:
            a number of pending working items in the issue queue exceeds a threshold number of pending work items and
            an oldest pending work item in the issue queue is older than a threshold age.

2. The method of claim 1, further comprising deactivating the power savings technique based on the execution criteria being met.

3. The method of claim 1, wherein the at least one of the pending work items is a non-critical pending work item.

4. A system comprising a processor, the system configured to perform a method comprising:
    applying a power savings technique to at least a subset of a processor;
    monitoring pending work items scheduled to be executed by the processor;
    grouping the pending work items based on the power savings technique, the grouping including delaying a scheduled execution time of at least one of the pending work items to increase an overall number of clock cycles that the power savings technique is applied to the processor;
    determining that an execution criteria has been met; and
    executing the pending work items based on the execution criteria being met and the grouping, wherein:
        the power savings technique is power gating,
        the pending work items are ready instructions located in an issue queue,
        the executing is by an execution unit on the processor,
        the power savings technique is applied to the execution unit, and
        the execution criteria includes at least one of:
            a number of pending working items in the issue queue exceeds a threshold number of pending work items and
            an oldest pending work item in the issue queue is older than a threshold age.

5. The system of claim 4, wherein the system is further configured to deactivate the power savings technique based on the execution criteria being met.

6. The system of claim 4, wherein the at least one of the pending work items is a non-critical pending work item.

7. A computer program product comprising:
    a computer readable storage medium having program instructions embodied therewith, the program instructions readable by a processing circuit to cause the processing circuit to perform a method comprising:
    applying a power savings technique to at least a subset of a processor;
    monitoring pending work items scheduled to be executed by the processor;
    grouping the pending work items based on the power savings technique, the grouping including delaying a scheduled execution time of at least one of the pending work items to increase an overall number of clock cycles that the power savings technique is applied to the processor;
    determining that an execution criteria has been met; and
    executing the pending work items based on the execution criteria being met and the grouping, wherein:

the power savings technique is power gating,
the pending work items are ready instructions located in an issue queue,
the executing is by an execution unit on the processor,
the power savings technique is applied to the execution unit, and
the execution criteria includes at least one of:
   a number of pending working items in the issue queue exceeds a threshold number of pending work items and
   an oldest pending work item in the issue queue is older than a threshold age.

8. The computer program product of claim 7, wherein the program instructions further cause the processing circuit to deactivate the power savings based on the execution criteria being met.

* * * * *